United States Patent
Mahoney

(10) Patent No.: US 6,604,937 B1
(45) Date of Patent: Aug. 12, 2003

(54) COHERENT JET SYSTEM WITH SINGLE RING FLAME ENVELOPE

(75) Inventor: William John Mahoney, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/153,669

(22) Filed: May 24, 2002

(51) Int. Cl.$^7$ ................ F23C 5/00; C21C 5/32
(52) U.S. Cl. ............ 431/8; 431/181; 431/187; 266/222; 266/225
(58) Field of Search ............ 431/8.9, 171, 116, 431/115, 187, 351, 181, 10; 239/424.5, 426; 266/225, 222, 268, 47; 75/414, 708, 530

(56) References Cited

U.S. PATENT DOCUMENTS

| | | | |
|---|---|---|---|
| 4,622,007 A | 11/1986 | Gitman | 432/13 |
| 5,714,113 A | 2/1998 | Gitman et al. | 266/182 |
| 5,772,421 A * | 6/1998 | Besik et al. | 431/187 |
| 5,814,125 A | 9/1998 | Anderson et al. | 75/414 |
| 6,096,261 A | 8/2000 | Anderson et al. | 266/225 |
| 6,139,310 A | 10/2000 | Mahoney et al. | 431/8 |
| 6,171,544 B1 | 1/2001 | Anderson et al. | 266/47 |
| 6,176,894 B1 | 1/2001 | Anderson et al. | 75/414 |
| 6,241,510 B1 * | 6/2001 | Anderson et al. | 431/187 |
| 6,383,445 B1 | 5/2002 | Anderson et al. | 266/225 |

* cited by examiner

*Primary Examiner*—James C. Yeung
(74) *Attorney, Agent, or Firm*—Stanley Ktorides

(57) ABSTRACT

A coherent jet lance and operating method wherein the need for a lance extension is eliminated using a single ring of ports to deliver flame envelope gases around the primary gas jets to maintain the gas jets coherent.

17 Claims, 2 Drawing Sheets

COHERENT JET SYSTEM WITH SINGLE RING FLAME ENVELOPE

TECHNICAL FIELD

This invention relates generally to coherent jet technology.

BACKGROUND ART

A recent significant advancement in the field of gas lancing is the development of the coherent jet technology disclosed, for example, in U.S. Pat. No. 5,814,125—Anderson et al. and in U.S. Pat. No. 6,171,544—Anderson et al. In the practice of this technology one or more high velocity gas jets ejected from one or more nozzles on a lance are maintained coherent over a relatively long distance by the use of a flame envelope around and along the high velocity gas jet(s). The flame envelope is formed by combusting fuel and oxidant ejected from the lance respectively from two rings of ports, an inner ring and an outer ring, around the high velocity gas jet nozzle(s). Typically the fuel for the flame envelope is ejected from the inner ring of ports and the oxidant for the flame envelope is ejected from the outer ring of ports. An extension on the lance perimeter forms a protected recirculation zone into which the high velocity gas jet(s) and the flame envelope fluids are provided from the nozzle(s) and ports. This recirculation zone enables some recirculation of the ejected fluids enabling improved ignition and improved stability of the flame envelope, thus enhancing the coherency and thus the length of the high velocity gas jet(s). The coherent jet(s) can be used to deliver gas into a liquid, such as molten metal, from a relatively long distance above the surface of the liquid. One very important application of this coherent jet technology is for providing oxygen for use in steelmaking operations such as electric arc furnaces and basic oxygen furnaces.

The recirculation extension, though constituting an improvement over earlier coherent jet systems, introduces certain problems concerning lance design and lance lifetime due to the need to water-cool the tip. These problems are of particular concern when the coherent jet system is used in a very harsh environment such as a basic oxygen furnace.

Accordingly, it is an object of this invention to provide a system which can produce effective coherent gas jets without the need for a lance extension or other element to establish a recirculation zone for the gases ejected from the lance.

SUMMARY OF THE INVENTION

The above and other objects, which will become apparent to those skilled in the art upon a reading of this disclosure, are attained by the present invention, one aspect of which is:

A method for establishing at least one coherent gas jet comprising:

(A) passing at least one gas jet out from at least one nozzle housed in a lance having a lance face, said lance face having a ring of ports around the said at least one nozzle;

(B) passing fuel out from a first set of ports of said ring and passing oxidant out from a second set of ports of said ring; and (C) combusting the fuel and the oxidant passed out from the first and second sets of ports of said ring to produce a flame envelope around the said at least one gas jet.

Another aspect of the invention is:

A coherent jet lance comprising:

(A) a lance having a lance face and having at least one nozzle having an opening at the lance face;

(B) a ring of ports on the lance face around the nozzle opening(s); and (C) means for providing fuel to a first set of ports of said ring and means for providing oxidant to a second set of ports of said ring.

As used herein the term "lance face" means the surface of a lance abutting an injection volume.

As used herein the term "coherent jet" means a gas jet which is formed by ejecting gas from a nozzle and which has a velocity and momentum profile along a length of at least $20d$, where d is the exit diameter of the nozzle, which is similar to its velocity and momentum profile upon ejection from the nozzle. Another way of describing a coherent jet is a gas jet which has little or no change in its diameter for a distance of at least $20d$.

As used herein the term "length" when referring to a coherent gas jet means the distance from the nozzle from which the gas is ejected to the intended impact point of the coherent gas jet or to where the gas jet ceases to be coherent.

DETAILED DESCRIPTION

The invention will be described in detail with reference to the Drawings.

Figure 1:
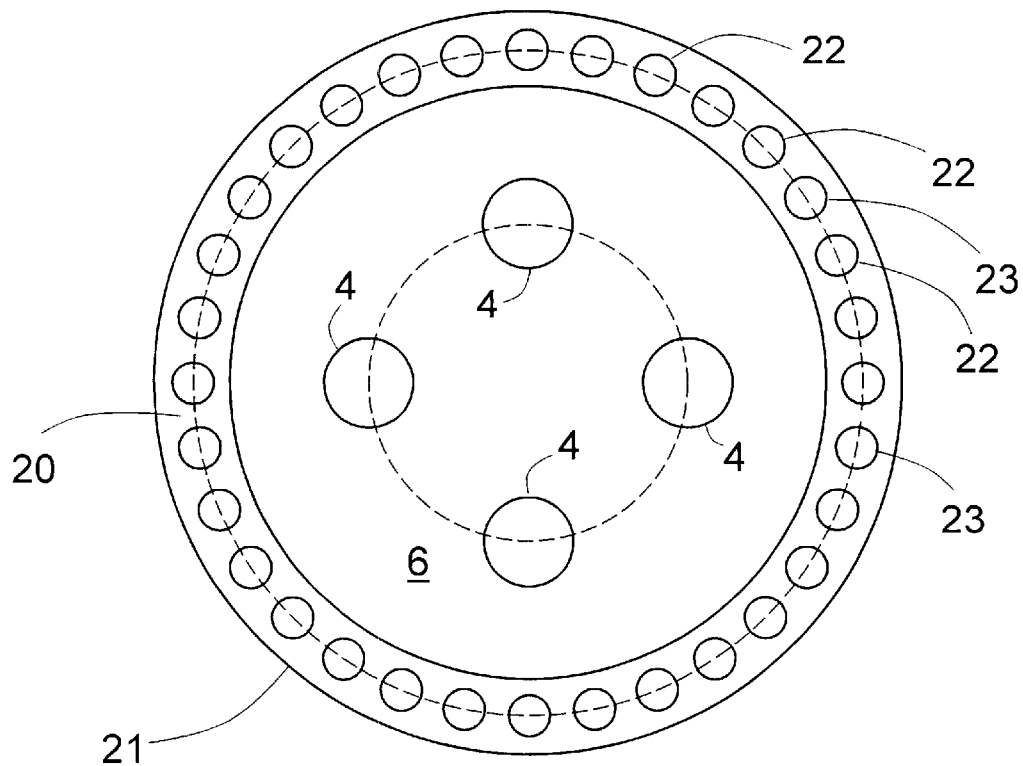
FIG. 1 is a head on view of one preferred embodiment of a lance face and FIG. 2 is a cross sectional view of one preferred embodiment of a lance having such lance face which may be used in the practice of this invention.
Figure 2:
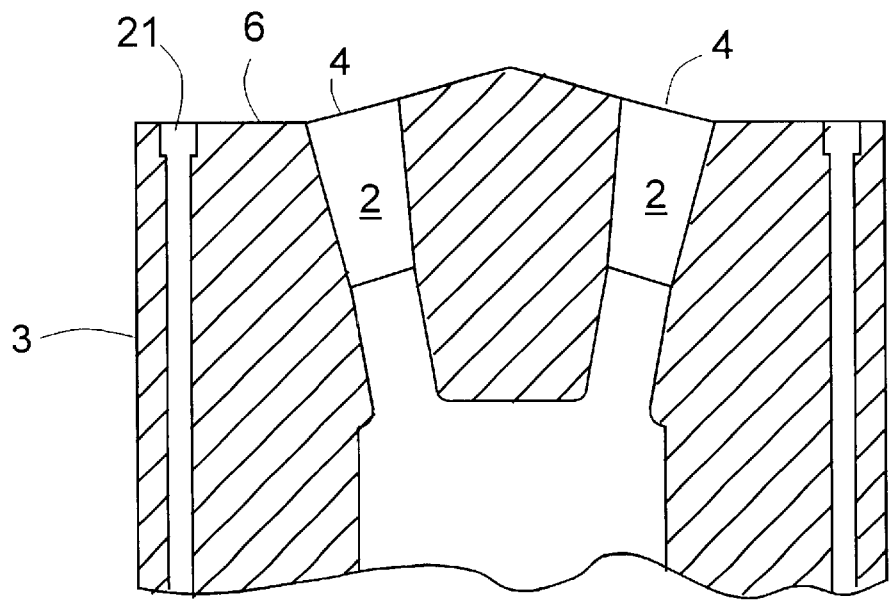
Figure 3:
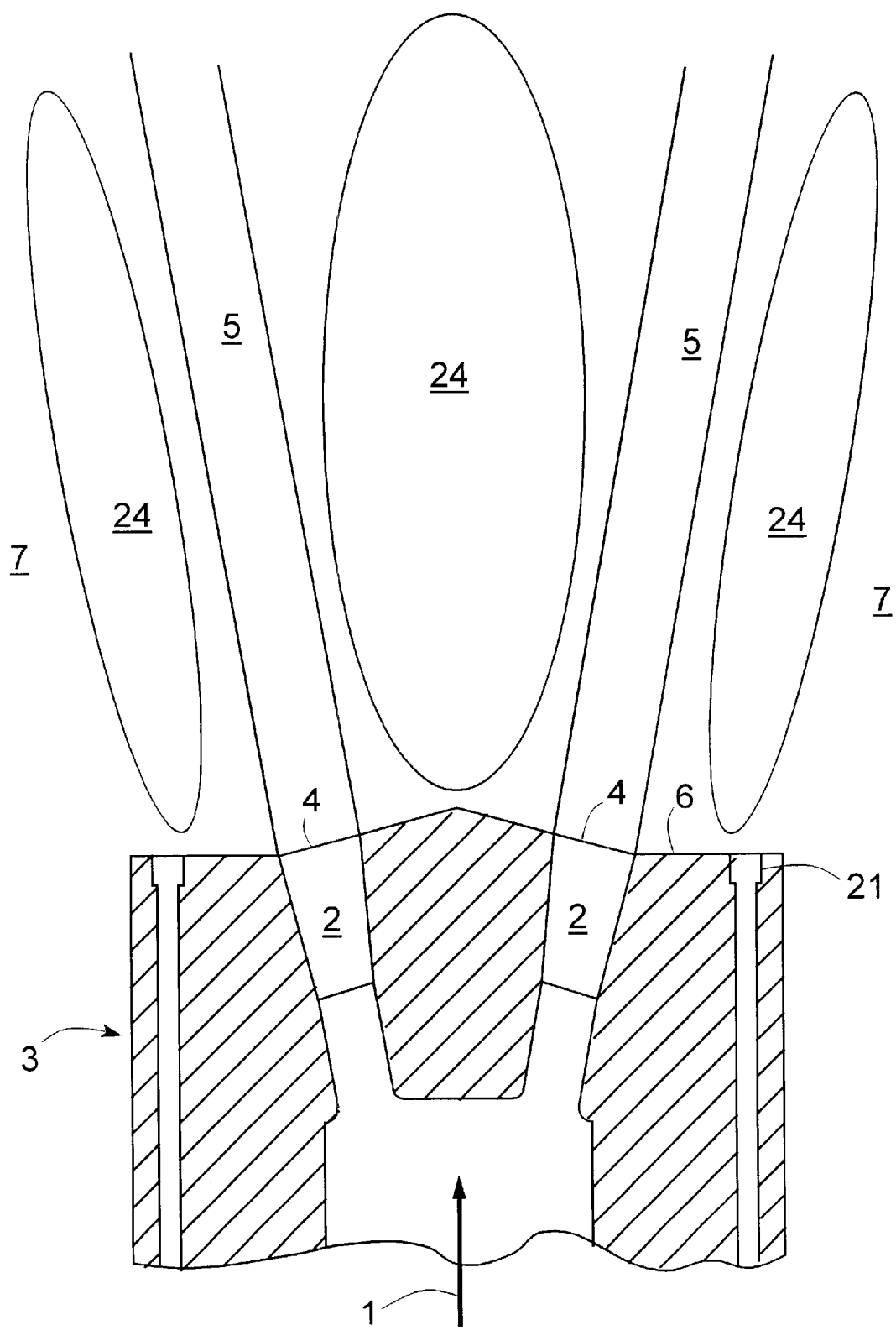
FIG. 3 illustrates the embodiment of the invention illustrated in FIGS. 1 and 2 in operation. The numerals in the Drawings are the same for the common elements.

Referring now to FIGS. 1, 2 and 3, gas as shown by flow arrow 1, is passed through at least one nozzle 2, preferably a converging/diverging nozzle, and then out from lance 3 through nozzle opening or openings 4 on lance face 6 to form a coherent gas jet stream or streams 5 in injection volume 7. Typically the velocity of the gas stream(s) 5 is within the range of from 700 to 3000 feet per second (fps). Preferably the velocity of the gas stream(s) 5 is supersonic when it is formed upon ejection from the lance face and remains supersonic for a distance of at least $20d$. Although the Drawings illustrate an embodiment employing four coherent gas jets ejected from the lance respectively through four nozzles, the number of gas jets ejected from the lance through respective nozzles in the practice of this invention may be within the range of from 1 to 6. Preferably the injection volume into which the coherent gas jets are injected is a metal producing furnace such as a steelmaking furnace. Most preferably, when a plurality of nozzles is employed, each nozzle is angled away from each other and from the center axis of the lance.

Any effective gas may be used as the gas for forming coherent jet or jets in the practice of this invention. Among such gases one can name oxygen, nitrogen, argon, carbon dioxide, hydrogen, helium, steam and hydrocarbon gases. Also mixtures comprising two or more gases, e.g. air, may be used as such gas in the practice of this invention.

A ring 20 of ports is located on the lance face around the nozzle opening or openings 4. Ring 20 is preferably a circle having a diameter within the range of from 1.5 to 16 inches. Generally ring 20 will comprise from 12 to 48 ports. Each port is preferably a circle having a diameter within the range of from 0.05 to 0.5 inch. Most preferably, as illustrated in the Drawings, the ring of ports are in a recession or groove 21 on lance face 6. Typically recession 21 has a depth within the range of from 0.05 inch to 2 inches and a width within the range of from 0.05 to 0.5 inch.

Fuel is provided to a first set of ports 22 on ring 20 and oxidant is provided to a second set of ports 23 on ring 20. Preferably, as illustrated in FIG. 1, the first set of ports 22 alternates with the second set of ports 23 on ring 20 so that each fuel port 22 has two oxidant ports 23 adjacent on either side of that fuel port, and each oxidant port 23 has two fuel ports 22 adjacent on either side of that oxidant port. The fuel and oxidant are ejected from lance 3 from their respective ports into injection volume 7. The velocity of the fuel and oxidant ejected from the ring of parts may be subsonic but preferably it is at sonic velocity. Sonic velocity of the injected fuel and oxidant enhances the rejection of foreign matter from entering and plugging the ports, which is especially important when the invention is employed in a harsh environment such as a steelmaking furnace. If desired, the velocity of the injected fuel and oxidant may be supersonic at a velocity of greater than Mach 1 up to Mach 2.

The fuel ejected from ports 22 is preferably gaseous and may be any fuel such as methane or natural gas. The oxidant ejected from ports 23 may be air, oxygen-enriched air having an oxygen concentration exceeding that of air, or commercial oxygen having an oxygen concentration of at least 90 mole percent. Preferably the oxidant is a fluid having an oxygen concentration of at least 25 mole percent.

The fuel and oxidant passed out from the lance form a gas envelope around gas jet(s) 5 which combusts to form a flame envelope or flame shroud 24 around the gas jet(s) 5 within the injection volume such as a molten metal furnace. Flame envelope 24 around the gas streams 5 serves to keep ambient gas from being drawn into the gas streams, thereby keeping the velocity of gas streams from significantly decreasing and keeping the diameter of the gas streams from significantly increasing, for at least a distance of 20d from the respective nozzle exit. That is, the flame envelope or flame shroud 24 serves to establish and maintain gas streams 5 as coherent jets for a distance of at least 20d from the respective nozzle exit.

A significant advantage of this invention is the ability to form effective coherent gas jets from a lance without the need to employ an extension on the lance. Heretofore a lance extension has been used to form a protected recirculation zone adjacent the lance face to improve the ignition and combustion of the flame shroud gases which are injected into this protected recirculation zone, thus improving the coherency of the gas jets. While the use of such a lance extension is a significant improvement over the initial coherent gas jet practice, there are problems with the use of such an extension. In the practice of this invention, the gases ejected from the lance are passed directly into the injection volume without passing through a protected zone or recirculation zone formed by a lance extension, yet the improved coherency observed with the use of a lance extension is still achieved.

Tests were conducted to evaluate the effectiveness the invention using a number of different designs for the supply of the flame shroud gas. The fuel used in the tests was natural gas and the oxidant used in the tests had an oxygen concentration of 99 mole percent and is referred to as the secondary oxygen. In each test the lance had four nozzles for the provision of the gas jets. The gas for the gas jets was oxygen having a purity of 99 mole percent and is referred to as the main oxygen. The tests are reported below and are presented for illustrative purposes and are not intended to be limiting.

Tests were performed to evaluate the effectiveness of the invention and to better understand the role of natural gas (NG) and oxidant port spacing. The tests were conducted by maintaining the number of shroud ports constant at 16 total (8 NG and 8 oxidant) while varying the spacing of the ports by changing the port circle diameter. The main nozzle circle diameter was held constant. Annular grooves were tested to aid flame stabilization. Below, the land ratio (LR) is defined as the spacing between the port perimeters (Land) divided by the sum of the port radii, LR Land/$(R_{SO}+R_{NG})$ On each test the fuel and oxidant were provided through alternating ports on the single ring of ports around the nozzles.

Injector Designs:

Injector #1 was a 16 total port design. The circle diameter was 2.125-in. The land ratio, LR=0.67.

Injector #2 was a 16 total port design. The circle diameter was 3.25-in. The LR=1.56.

Injector #3 was a 16 total port design. The circle diameter was 4.25-in. The LR=2.34.

Conditions:

Main Oxygen=40,000 standard cubic fee per hour (scfh) oxygen (165 psig supply pressure)

Main Nozzles=0.38-in./0.26-in. exit-to-throat dia., angled out 12°

NG Velocity=670 fps (@ 5,000 scfh)

Secondary Oxygen Velocity=320 fps (@ 4,000 scfh)

No re-circulation extension

Grooves=0.281-in. wide×0.25-in. depth

Injector #1: For a constant NG flow of 5,000 scfh, excellent coherent jets were obtained, typically 20-in., which exceeds the length of the conventional two-ring design. The flame was stable over a broad range of conditions. This injector was not tested with an annular groove.

Injector #2: Without a grove, the coherent jet length decreased slightly compared to injector #1. When a groove was added, the coherent jet length improved and exceeded the results obtained with injector #1.

Injector #3: Without a groove, the coherent jet length was substantially shorter. The flame operated in a lifted mode, which caused the shorter coherent jets. Adding a groove stabilized the shroud, which resulted in a full recovery of the coherent jet length.

With the goal of possibly eliminating shroud port plugging in a basic oxygen furnace, tests were conducted to observe if the ports could be operated at sonic flow conditions. Several single-ring designs were tested. The natural gas and secondary oxygen ports were sized to operate at Mach 1 when the flow rates of natural gas and secondary oxygen were 5,000 scfh and 4,000 scfh, respectively. Annular grooves of different depths were added to stabilize the flame shroud.

Injector Designs:

Injector #4 was a single-ring design with 32 total ports. The NG and secondary oxygen port diameters were 0.10-in. Ring diameter=2.0 inches and LR=0.96 inch.

Injector #5 was a single-ring design with 24 total ports. The NG and secondary oxygen port diameters were 0.115-in. Ring diameter 2.0 inches and LR=1.28 inches.

Injector #6 was a single-ring design with 16 total ports. The NG and secondary oxygen port diameters were 0.141-in. Ring diameter=2.0 inches and LR=1.79 inches.

Injector #7 was a single-ring design with 32 total ports. The NG and secondary oxygen port diameters were 0.10-in. Ring.diameter=2.75 inches and LR=1.70 inches.

Conditions:

Main Oxygen=40,000 scfh oxygen (165 psig supply pressure)

Nozzles=0.38-in./0.26-in. exit-to-throat dia., angled out 12 deg.

NG Velocity=1364 fps (Mach 1) (@ 5,000 scfh)

Sec. Ox. Velocity=982 fps (Mach 1) (@ 4,000 scfh)

No extension

Groove Size=Varied (Width×Depth)

Injector #4: Without a groove, the coherent jet length was poor, which was the result of a detached flame. Good coherent jets were obtained for the 1.25D×1.25D and 1.25D×2D grooves. [Groove notation=width×depth; D=port diameter].

Injector #5: Without the groove, the lance was difficult to light (unstable). Good coherent jets were obtained for the 1D×1D, 1D×1.5D and 1D×2D grooves.

Injector #6: Without the groove, the lance was very difficult to light; the coherent jet lengths were essentially the non-shrouded values. The groove stabilized the shroud combustion; however, relatively poor coherent jets were obtained even with a fairly deep 1D×2D groove.

Injector #7: Without the groove, poor coherent jets were obtained. Good coherent jets were obtained with a 1.25D×1.25D groove.

Although the invention has been described in detail with reference to certain preferred embodiments, those skilled in the art will recognize that there are other embodiments of the invention within the spirit and the scope of the claims.

What is claimed is:

1. A method for establishing at least one coherent gas jet comprising:

(A) passing at least one gas jet out from at least one nozzle housed in a lance having a lance face, said lance face having a ring of ports around the said at least one nozzle;

(B) passing fuel out from a first set of ports of said ring and passing oxidant out from a second set of ports of said ring; and (C) combusting the fuel and the oxidant passed out from the first and second set of ports of said ring to produce a flame envelope around the said at least one gas jet.

2. The method of claim 1 wherein the gas jet(s) passed out from the lance have a supersonic velocity.

3. The method of claim 1 wherein a plurality of gas jets are passed out from the lance.

4. The method of claim 1 wherein the velocity of the fuel and the oxidant passed out from the ring of ports is subsonic.

5. The method of claim 1 wherein the velocity of the fuel and the oxidant passed out from the ring of ports is sonic.

6. The method of claim 1 wherein the fuel and oxidant are passed out from the first set of ports and the second set of ports respectively which alternate on the ring of ports.

7. The method of claim 1 wherein the said at least one gas jet and the fuel and the oxidant are passed out from the lance directly into an injection volume without passing through a recirculation zone formed by an extension on the lance.

8. The method of claim 1 wherein the said at least one gas jet and the fuel and the oxidant are passed out from the lance into a molten metal furnace.

9. The method of claim 1 wherein the said at least one gas jet each travel for a distance of at least 20 d, where d is the exit diameter of the nozzle from which said gas jet is passed, while maintaining the diameter of said gas jet substantially constant.

10. A coherent jet lance comprising:

(A) a lance having a lance face and having at least one nozzle having an opening at the lance face;

(B) a ring of ports on the lance face around the nozzle opening(s); and (C) means for providing fuel to a first set of ports of said ring and means for providing oxidant to a second set of ports of said ring; said first and second sets of ports oriented such that the fuel and oxidant form a flame envelope when passed out from the ports.

11. The coherent jet lance of claim 10 having a plurality of nozzles.

12. The coherent jet lance of claim 11 wherein each nozzle is angled away from the lance centerline.

13. The coherent jet lance of claim 10 wherein the ring of ports is within a recession on the lance face.

14. The coherent jet lance of claim 10 wherein the ring of ports is a circle having a diameter within the range of from 1.5 to 16 inches.

15. The coherent jet lance of claim 10 wherein the total number of ports in the ring of ports is within the range of from 12 to 48.

16. The coherent jet lance of claim 10 wherein the first set of ports alternates with the second set of ports.

17. The coherent jet lance of claim 10 having no extension to form a recirculation zone adjacent the lance face.

* * * * *